April 14, 1970     H. M. GAMMON     3,506,127
APPARATUS FOR REMOVING WATER FROM FLUIDS Filed Feb. 2, 1968     2 Sheets-Sheet 1

INVENTOR.
HOWARD M. GAMMON
BY
Wilson + Fraser
ATTORNEYS

April 14, 1970     H. M. GAMMON     3,506,127

APPARATUS FOR REMOVING WATER FROM FLUIDS

Filed Feb. 2, 1968     2 Sheets-Sheet 2

INVENTOR.
HOWARD M. GAMMON

BY
*Wilson + Fraser*

ATTORNEYS

United States Patent Office 3,506,127
Patented Apr. 14, 1970

3,506,127
APPARATUS FOR REMOVING WATER FROM FLUIDS
Howard M. Gammon, Newark, N.J., assignor to Filters, Inc., San Jose, Calif., a corporation of California
Filed Feb. 2, 1968, Ser. No. 702,601
Int. Cl. B01d 29/04, 25/04, 25/02
U.S. Cl. 210—300                                                      6 Claims

ABSTRACT OF THE DISCLOSURE

A filter separator assembly employing a separator element for separating water from hydrocarbon liquids wherein the separator element is formed of a material which effects a substantially uniform fluid flow therethrough throughout the length thereof and militates against the passage of water therethrough while allowing for the passage of a hydrocarbon fluid.

BACKGROUND OF THE INVENTION

In apparatus designed and constructed for use in purifying fuels used in aircraft engines, for example, it is of utmost importance that the apparatus be effective in filtering and dehydrating such fuels so as to positively assure freedom from failure of engine parts which would cause engine failures or erratic operation, incomplete combustion, corrosion, and undue accumulation of carbon deposits frequently resulting from the presence of sludge and water.

Typically, apparatus designed to achieve the desired objectives of purifying aircraft fuels is comprised of two stages; namely, the first stage comprising a coalescing and filtering stage, and the second stage comprising a water separating stage. The apparatus is arranged wherein the coalescing and filtering elements and the separating elements are disposed vertically or horizontally within a corresponding filter separator housing or vessel. The fluid being treated is initially caused to be passed through the coalescing and filtering stage which typically removes particulate contaminants and coalesces the water content therein. Then, the fluid is passed to an outlet through the separating stage which is pervious to the fluid being treated and substantially impervious to water and thereby militates against the passage of any water therethrough. The coalesced water content tends to drop, by gravity, to the bottom of the housing and is suitably discharged therefrom. The size of the overall filter separator apparatus has a certain relationship to the gallons per minute of fluid which may be treated thereby.

In separating water from hydrocarbon fluids, there is a definite relationship between the surface area of the hydrophobic separating media and the velocity of the fluid being treated passing across it. In the event the velocity of the transient fluid increases beyond a certain point for a given apparatus, the pressure drop across water drops being separated by the media becomes great enough to force water therethrough. Accordingly, there must be a sufficiently large area of separating media to separate the water from the fluid for a given flow rate.

Depending upon the rating of the filter separator, the vessel must contain a certain number of square inches of separating area, as well as, a certain number of coalescing and filtering elements. The fewer the number of separators that can be employed to achieve the desired rating, the smaller the containing vessel. It is known that enlarged surface areas can be achieved by pleating a cylindrical coalescing element. However, pleated separating elements have not been successfully employed in attempts to reduce the ratio of the number of separator elements to the number of coalescer elements due, in large part, to an unequal pressure drop of the fluid along the length of the separator element resulting in a passage of water therethrough at the high velocity zones and a resultant failure of the system.

It has been found that in the operation of filter separator assemblies employing the usual considerably porous separating media for the separating elements, the velocity of the fluid passing through the elements adjacent the outlet was very high. In this high velocity zone, a pressure drop was established which was above the maximum pressure drop for restricting the flow of water through the separating media and caused a "break-through" of water through the separator element. The practice typically followed to overcome this problem has been to introduce a sufficient amount of additional separating media to reduce the velocity of the fluid across the entire outer surface of the operator elements to an acceptable limit whereby all water would be satisfactorily blocked thereby. Obviously, the additional separating media requires a corresponding larger vessel.

In the previous attempts to achieve an effective separating stage, the assemblies have embodied the principle of controlling the pressure drop, or more specifically, controlling the velocity of fluid flow through the second stage or separator stage of the filter separator assembly. Basically, a secondary or internal member is placed downstream of the separating media through which the fluid must also flow. This secondary or internal member has a greater resistance to flow at the end nearest the outlet end of the separator element. The least resistance to fluid flow occurs at the end farthest from the outlet end of the separator element. By carefully controlling the porosity of the inner member, which is of a generally cylindrical nature, it is possible to control the velocity of the fluid through the hydrophobic media so that it will be uniform from one end of the separator element to the other. Parenthetically, it is clear that the bulk of the fluid tends to pass through the separator element at the end nearest the outlet end if the separating media is inherently low in resistance to flow, resulting in an extremely high velocity of the fluid flow through the portion of the separator element that is nearest its outlet. Conversely, the velocity at the end of the element that is farthest from the outlet end is very low. This difficulty is one that becomes more and more severe as the separator element becomes longer and longer. The reason for this is that that portion of the fluid flow that enters the separator through the media that is closest the outlet end does not have to flow through the center tube of the separator element. Also, the flow of fluid which enters the separator element at the end opposite the outlet must flow all the way down through the center tube of the element, thereby encountering a greater resistance because of its longer flow path. It is obvious that without some means to make the velocity of the flow through the separating media uniform over the entire length of an element, a large amount of hydrophobic material must be used in order to insure that the velocity through any portion of that media will not exceed the velocity that will cause water drops to be fractured and forced through the separator.

It is an object of the present invention to improve the water separating rating of a filter separator by eliminating the second member and employing a hydrophobic material that has a high resistance to fluid flow at one end and a lower resistance to fluid flow at the other end. The above object is achieved by providing means for effecting a substantially uniform distribution of the flow of the fluid being treated across the entire surface of the separating media whereby the pressure drop across the separating media is maintained below that level which would cause a "breakthrough" of water.

SUMMARY

The present invention contemplates a filter separator assembly for removing contaminants from fluids containing a water content including a vessel having an inlet and an outlet, a filtering and coalescing stage between the inlet and the interior of the vessel, and a separating stage between the interior of the vessel and the outlet, the improvement comprising: at least one separating element in the separating stage composed of a hollow cylinder of woven material wherein the warp filaments are close together at one end and are spaced gradually farther apart as they approach the opposite end and the woof or shoot filaments are evenly spaced throughout thereby effecting a uniform distribution of the flow of fluid through the element throughout the length thereof.

BRIEF DESCRIPTION OF THE DRAWINGS

The above objects and advantages of the invention will become readily apparent from reading the following detailed description of an embodiment of the invention when considered in the light of the accompanying drawing, in which.

DESCRIPTION OF PREFERRED EMBODIMENTS OF THE INVENTION

Figure 1:
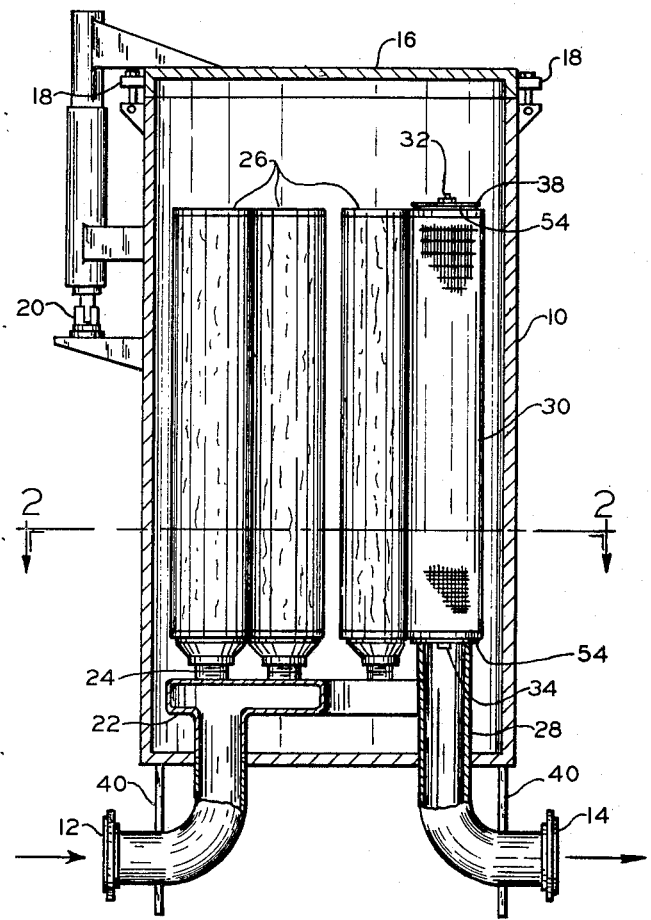
FIGURE 1 is an elevational sectional view of a filter separator assembly incorporating apparatus of the invention.
Figure 2:
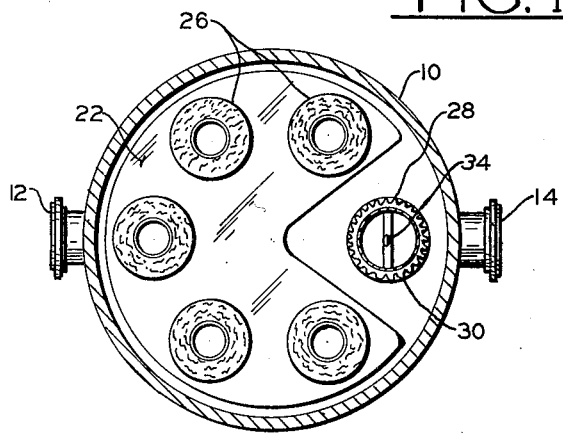
FIGURE 2 is a sectional view of the assembly illustrated in FIGURE 1 taken along line 2—2 thereof.
Figure 3:
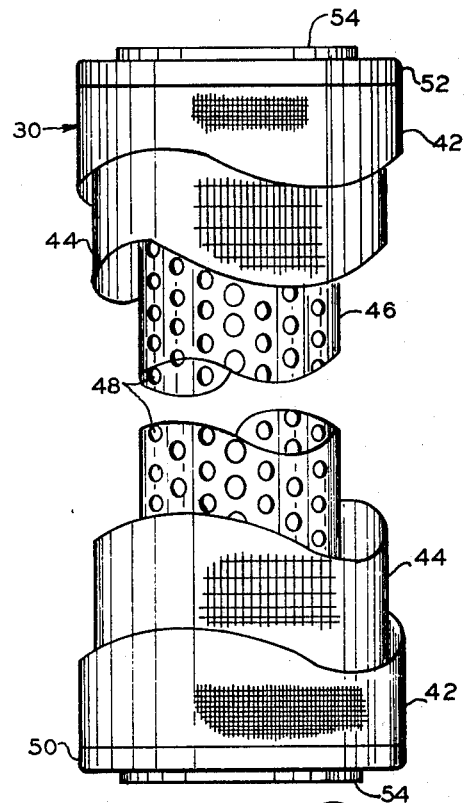
FIGURE 3 is an enlarged elevational view partially cutaway of the separator element illustrated in FIGURES 1 and 2.

Referring to FIGURES 1, 2, and 3, there is illustrated a filter separator assembly including a vertically extending cylindrical vessel or container 10 having an inlet port 12 and an outlet port 14 disposed at the bottom of the vessel. The open top of the vessel 10 is provided with a top closure lid 16 which is fastened to the vessel by means of a plurality of swing bolt units 18. When the swing bolt units 18 are loosened, the lid 16 may be lifted and swung away from the vessel by a lid lifting device 20 to provide ready access to the interior of the vessel. At the bottom of the vessel 10, there is an inlet manifold 22 in fluid communication with the inlet port 12 and provided with a plurality of upstanding externally threaded nipples 24. The externally threaded nipples 24 threadably receive the internally threaded end cap members of a plurality of upstanding cylindrical filter and coalescer cartridges 26.

Adjacent the inlet manifold 22, there is disposed an outlet pipe 28 in fluid communication with the outlet port 14. An upstanding cylindrical separator element 30 is suitably bolted in fluid communication with the outlet pipe 28 by means of an elongate bolt 32 which extends through a spider element 34 in the open end of the pipe 28 and thence through the hollow interior of the separator element 30 and has a threaded nut 36 at the upper extremity thereof. The nut 36 suitably secures an end plate 38 against gasket means at the top of the separator element 30 to provide a liquid tight seal therebetween. Suitable gasket means are likewise provided between the lower portion of the separator 30 and the upper open end of the outlet pipe 28.

The vessel or container 10 is supported by any suitable legs 40 secured to the exterior of the vessel in any well known manner.

The filtering and coalescing cartridges 26 are preformed and are typically comprised of a convolute tube or cylinder of fiber glass material bonded together by a resin binder. The fiber glass cylinder is then provided with a closed plastic end cap at the top and a hollow internally threaded end cap at the bottom. The cartridges 26 are typically designed for inside-out flow of the fluid being treated.

The separator element 30 is typically formed of an outer layer 42 of screen material. Spaced slightly inwardly from the layer 42 of screen material, there is a second layer 44 of screen material typically of a substantially greater mesh size than the screen material of the layer 42. The layer 44 is employed in the operation of the separator element to militate against any tendency of the outer layer 42 to collapse. Spaced inwardly of the layer 44 is a perforated metal tube 46 having a plurality of holes 48 formed throughout the entire surface thereof.

The opposite ends of the above described assemblage are provided with annular end caps 50 and 52 which are secured to the respective ends of the assemblage of the layers 42, 44, and the center tube 46. The exposed end of each of the end caps 50 and 52 is provided with an annular gasket 54.

The screen material of the layer 42 is typically formed of a metal screen to which is imparted a hydrophobic property by coating the filaments which make up the screen with a material which is not readily wetted by water. It has been found that a fluorocarbon plastic of the type commercially available and referred to as a "Teflon" has the desired properties. However, other water repellent can likewise be satisfactorily employed. Of course, hydrophobic monofilaments could be used for forming the screen material 42 with satisfactory results. The structure of the screen material 42 is such that the warp wires are close together at the bottom portion of the separator 30 most adjacent the outlet 14 and are spaced apart a continuously greater amount along the length of the separator 30 toward the opposite end thereof. The woof or shoot filaments are spaced an equal distance apart and have no variability in the preferred embodiment. The result of such a structure is to effectively establish a greater resistance to the flow of fluid through the separator adjacent the outlet 14 and a lesser resistance to the flow of the fluid adjacent the opposite end thereof.

In operation, the influent to be treated is directed into the system through the inlet port 12. The influent, which is typically an emulsion of hydrocarbon fluid and water, is directed into the inlet manifold 22 and thence into the interior of the filtering and coalescing cartridges 26. As the fluid flows through the fibrous media of the cartridges 26, particulate contaminants are trapped therein and the emulsion is broken down and the water content is coalesced into small water droplets that form on the ouside of coalescer elements. These small water droplets grow larger, eventually fall off of the coalescer, and then tend to gravitate toward the bottom of the vessel 10 and are discharged through a suitable valved discharge assembly, not shown. After passing through the cartridges 26, the fluid is directed into the interior of the vessel 10 and thence to the separating element 30. The screen layer 42, being substantially pervious to a hydrocarbon fluid and impervious to water, will allow the clean dry fluid to pass through the screen layer 42 while militating against the passage of any water droplets which may not have dropped to the bottom of the vessel 10 and have been carried by the transient fluid to the screen layer 42 of the separator 30. The clean dry fluid passes through the screen 44, through the perforations 48 in the tube 46 and thence to the outlet port 14 through the outlet pipe 28.

It has been found in practice that with the screen layer 42 having a density or mesh openings therein of the same size throughout, an unequal distribution of fluid flow occurred along the length of the separator causing the fluid flowing through the separator in the vicinity of the outlet to have an extremely high velocity with respect to the velocity of the fluid flowing through the separator at the opposite end. Accordingly, the pressure drop across the separator element 30 caused by the varying velocity of the fluid therethrough varied along the longitudinal length thereof with the pressure drop at the bottom of the element near the outlet thereof to be above the desired maximum. Such a condition caused the water collected at the bottom of the separator element 30 to be forced through the screen layer 42 allowing water to be present in the effluent passing through the outlet port 14 resulting in a consequent failure of the system. It has been found that by employing a means to resist the flow of fluid through the separator 30 to provide a substantially uniform distribution of the flow of fluids thereacross, the pressure drop along the entire length of the separator media could be controlled to be substantially equal, thereby militating against the passage of any water content through the separator media and achieving a separator element of increased efficiency and effectiveness. It will be appreciated that the graded porosity or open area formed by the varying openings in the screen layer 42 will effectively cause a substantial equalization in the distribution of the velocities of the fluid passing therethrough to the interior of the tube 46 and thence to the oulet 14.

Figure 4:
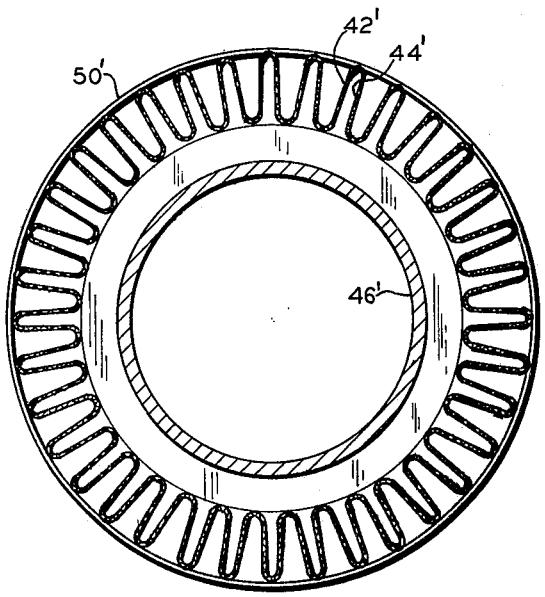
FIGURE 4 is a sectional view of a modified form of the invention wherein the separator separating media is in pleated form.

While specific reference has been made to forming the screen layer 42 in a smooth cylindrical form, it will be appreciated that certain increased capacities of the separator element 30 could be achieved by pleating the layer 42 to increase the surface area of the separating media. FIGURE 4 shows such a modified form of the invention wherein the outer layer 42' of mesh material and the reinforcing layer 44' are pleated to effectively increase the surface area of the hydrophobic separating media of the separator element. The center tube 46' remains annular in cross-section in such a modification.

The principle of having the hydrophobic material with a variable resistance from one end of the separator element to the other can also embody the use of bands of hydrophobic media ranging from the most flow resistant band located nearest the outlet end of the separator and the least flow resistant band located farthest from the outlet end of the separator. For example, it can be shown that a filter separator can be improved in performance by stacking separators of ever-decreasing flow resistance, one on top of another. For example, a typical 600 gallon per minute vertical filter separator that is currently in use, can be increased in its flow rate capacity to some higher level such as 650 gallon per minute simply by using stacked separator elements wherein the separator element that is closest to the outlet has a greater flow resistance than the one at the top of the stack of separators. It should also be understood that a full length separator can be made by using two or more bands of hydrophobic material seamed together where one grade ends and the second grade begins.

The use of different grades of wire cloth in bands could employ other than the conventional square mesh wire cloth that has commonly been used in making separator elements. For example, a twilled sixty mesh wire cloth offers approximately twice the resistance to flow of a conventional two hundred mesh square weave. By employing a 30 x 150 mesh plain dutch weave, the resistance to flow can be increased even more, by a factor of about 2. By employing approximately a 50 x 300 twilled dutch weave, it is possible to increase the resistance by a factor of 2. In other words, by selecting grades of wire cloth with different weaves, it is possible to have a range of pressure drop characteristics of at least 10 to 1 without utilizing the extremely expensive aircraft grades of twilled dutch wire cloth. In the range of the viscosity of jet fuel there is little to be gained by changing the grade of square mesh wire cloth from one hundred mesh to four hundred mesh because of the inherent pressure drop characteristics of these grades is very similar. On the other hand, it is possible to alter the flow resistance characteristics of even these square mesh materials by calendering the cloth after it is woven to reduce its pore size. The objectives of this invention can also be achieved by using one grade of wire cloth throughout, but by variably calendering over the length of the element; one end can be made to have a higher flow resistance than the other. This concept can also incorporate coatings on the cloth to reduce pore size at one end.

It should also be understood that the concept described hereinabove, is especially useful when it is desired to use the internal volume of a separator element for other purposes. For example, conventional separators have been built with monitoring fuses located in the region that is internal of the separator element but with the use of an internal member to control the velocity through the separator media, the space that can be used for holding fuses is greatly reduced. Another advantage of the invention is providing the internal volume of the separator to be free for other purposes so that final stage safety filters could be located inside the separator element. Ideally, these take the form of pleated paper elements, one per separator element.

What I claim is:

1. In a filter separator assembly for removing contaminants from fluids including a vessel having an inlet and an outlet, a filtering and coalescing stage between the inlet and the interior of the vessel, and a separating stage between the interior of the vessel and the outlet, the separating stage including a separating element comprising:

a hollow cylindrical member, said member including a porous material which will substantially prevent the passage of water therethrough while permitting the the passage of hydrocarbon fluids therethrough, said material being graded in porosity from one end to the other; and means for attaching the end of said member containing the material of the least porosity to the outlet of the vessel.

2. The invention defined in claim 1 wherein said porous material is screen cloth.

3. The invention defined in claim 2 wherein said screen cloth is provided with a hydrophobic coating.

4. The invention defined in claim 2 wherein said coating is a fluorocarbon plastic material.

5. The invention defined in claim 2 wherein said screen cloth is composed of filaments of hydrophobic material.

6. The invention defined in claim 1 wherein said material is in discrete bands of differing porosity.

References Cited

UNITED STATES PATENTS

| | | | |
|---|---|---|---|
| 2,559,267 | 7/1951 | Winslow et al. | 210—323 X |
| 3,088,592 | 5/1963 | Clark | 210—114 |
| 3,312,504 | 4/1967 | Kasten | 210—314 X |
| 3,384,241 | 5/1968 | Mostrand | 210—315 |

REUBEN FRIEDMAN, Primary Examiner

F. A. SPEAR, JR., Assistant Examiner

U.S. Cl. X.R.

210—316, 497